United States Patent
Wilkerson et al.

(10) Patent No.: US 7,480,838 B1
(45) Date of Patent: Jan. 20, 2009

(54) METHOD, SYSTEM AND APPARATUS FOR DETECTING AND RECOVERING FROM TIMING ERRORS

(75) Inventors: Chris Wilkerson, Portland, OR (US); Shih-Lien L. Lu, Portland, OR (US); Edward Grochowski, San Jose, CA (US); Murali Annavaram, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 390 days.

(21) Appl. No.: 11/388,668

(22) Filed: Mar. 23, 2006

(51) Int. Cl.
*G06K 5/04* (2006.01)

(52) U.S. Cl. .................................................. 714/700

(58) Field of Classification Search ............... 714/700, 714/744
See application file for complete search history.

(56) References Cited

U.S. PATENT DOCUMENTS

| | | | |
|---|---|---|---|
| 6,100,732 A * | 8/2000 | Penry et al. | 327/144 |
| 6,545,508 B2 * | 4/2003 | Senba | 327/20 |
| 6,864,715 B1 * | 3/2005 | Bauer et al. | 326/46 |
| 7,100,067 B2 * | 8/2006 | Hansen et al. | 713/500 |
| 7,233,599 B2 * | 6/2007 | Deas et al. | 370/420 |
| 7,293,210 B2 * | 11/2007 | Gunda et al. | 714/726 |

OTHER PUBLICATIONS

U.S. Appl. No. 11/234,548, filed Sep. 23, 2005, entitled "Method and Apparatus for Late Timing Transition Detection," (22 pages).
Y. Cao, et al., "Yield Optimization with Energy-Delay Constraints in Low-Power Digital Circuits," IEEE Conference on Electronic Devices and Solid-State Circuits, Dec. 2003 (pp. 285-288).
D. Ernst, et al., "Razor: A Low-Power Pipeline Based on Circuit-Level Timing Speculation," Proceedings of the 36th International Symposium on Microarchitecture (Micro-36'03), IEEE, Dec. 2003 (12 pgs).

* cited by examiner

*Primary Examiner*—James C Kerveros
(74) *Attorney, Agent, or Firm*—Blakely, Sokoloff, Taylor & Zafman LLP (57) ABSTRACT

Methods and systems to facilitate an efficient circuit for detecting internal timing errors for integrated devices, including a hierarchy of reporting the detection of the timing error from a circuit level to a functional unit block (FUB) level up to a global detection, and a reorder buffer (ROB) for storing a result for timing error recovery until the timing can be verified to be error free.

10 Claims, 9 Drawing Sheets

METHOD, SYSTEM AND APPARATUS FOR DETECTING AND RECOVERING FROM TIMING ERRORS

BACKGROUND OF THE INVENTION

1. Field of the Invention

The present invention relates to detecting and/or recovering from a timing error for an integrated device, wherein the timing error may result from a variety of conditions, such as, manufacturing or environmental variations, integrated device variations, circuit design issues, device aging, etc.

2. Description of the Related Art

As the technology for manufacturing integrated circuits advances, more logic functions are included in a single integrated circuit device or a system on a chip (SoC). Modern integrated circuit (IC) devices include large numbers of gates on a single semiconductor chip, with these gates interconnected so as to perform multiple and complex functions. The fabrication of an IC incorporating such Very Large Scale Integration (VLSI) must be error free, as any manufacturing defect may prevent the IC from performing all of the functions that an IC or SoC is designed to perform. Such demands require verification of the design of the IC or SoC and also various types of electrical testing after the IC or SoC is manufactured.

However, as the complexity of the ICs and SoCs increase, so does the cost and complexity of verifying and electrically testing the individual IC or multiple ICs in a system for a SoC. Testing, manufacturing costs and design complexity increase dramatically because of the increasing number of functional pins on the integrated devices and SoC. With the increased number of I/O pins on each integrated device or system, the complexity and cost of testing each integrated device and I/O pin has increased.

Verifying the functionality of an IC is typically accomplished by placing the IC on a tester that includes a tester channel for each I/O pin on the IC. Subsequently, each I/O buffer coupled to an I/O pin is tested for functionality, timing, performance, etc. However, there are often problems associated with testing an IC in this manner. One problem is that testing each I/O pin on an IC is time consuming and often expensive due to test equipment costs. Another problem is that the speed of the test equipment is typically not fast enough to keep pace with the IC. Moreover, existing test equipment is not capable of testing high-speed source synchronous systems. Another problem with testing is the ability to detect timing errors because of the need to make the timing error externally visible to the testing environment.

Figure 1:
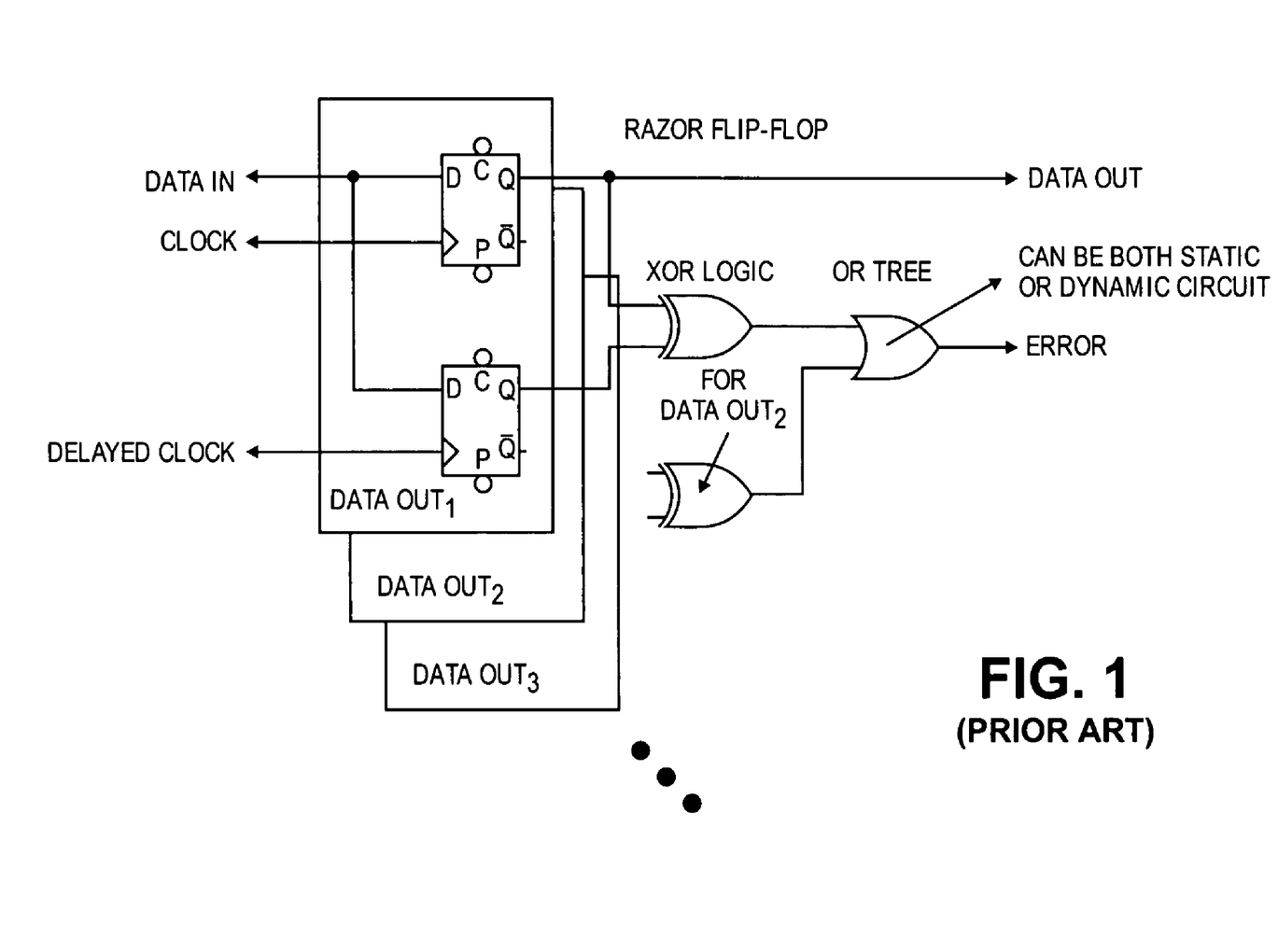
FIG. 1 illustrates the prior art.

One example of a circuit schematic for detecting internal timing errors is depicted in FIG. 1. However, this schematic is inefficient in terms of die size and design since it requires a pair of state elements for each signal.

BRIEF DESCRIPTION OF THE SEVERAL VIEWS OF THE DRAWINGS

Subject matter is particularly pointed out and distinctly claimed in the concluding portion of the specification. The claimed subject matter, however, both as to organization and method of operation, together with objects, features, and advantages thereof, may best be understood by reference to the following detailed description when read with the accompanying drawings in which:

DETAILED DESCRIPTION OF THE INVENTION

A method, apparatus, and a system for detecting an internal timing error for a circuit of an integrated device are described. In one embodiment, recovering from the timing error is also discussed. In the following description, for purposes of explanation, numerous details are set forth in order to provide a thorough understanding of the present invention. However, it will be apparent to one skilled in the art that these specific details are not required in order to practice the present invention.

An area of current technological development relates to reducing test complexity and cost. As previously described, DFT methods and test circuits facilitate the testing of ICs and SoCs. However, present solutions have a large impact for die size or increasing testing costs. In contrast, the claimed subject matter facilitates a method and apparatus that incorporates an efficient means for detecting an internal timing error. Also, the claimed subject matter allows a hierarchy of reporting the detection of the timing error from a circuit level to a functional unit block (FUB) level up to a global detection by logically ORing each level. In another aspect, the claimed subject matter allows for recovery from the timing error by illustrating one embodiment of storing a result in a reorder buffer (ROB) until timing can be verified to be error free. Otherwise, the integrated device will recomputed the results in the event of a timing error.

Thus, the claimed subject matter allows for efficient timing error detection by utilizing circuits that utilize one state element per signal and teaches various methods for detecting and escalating the error and recovering from the timing error.

Figure 2:
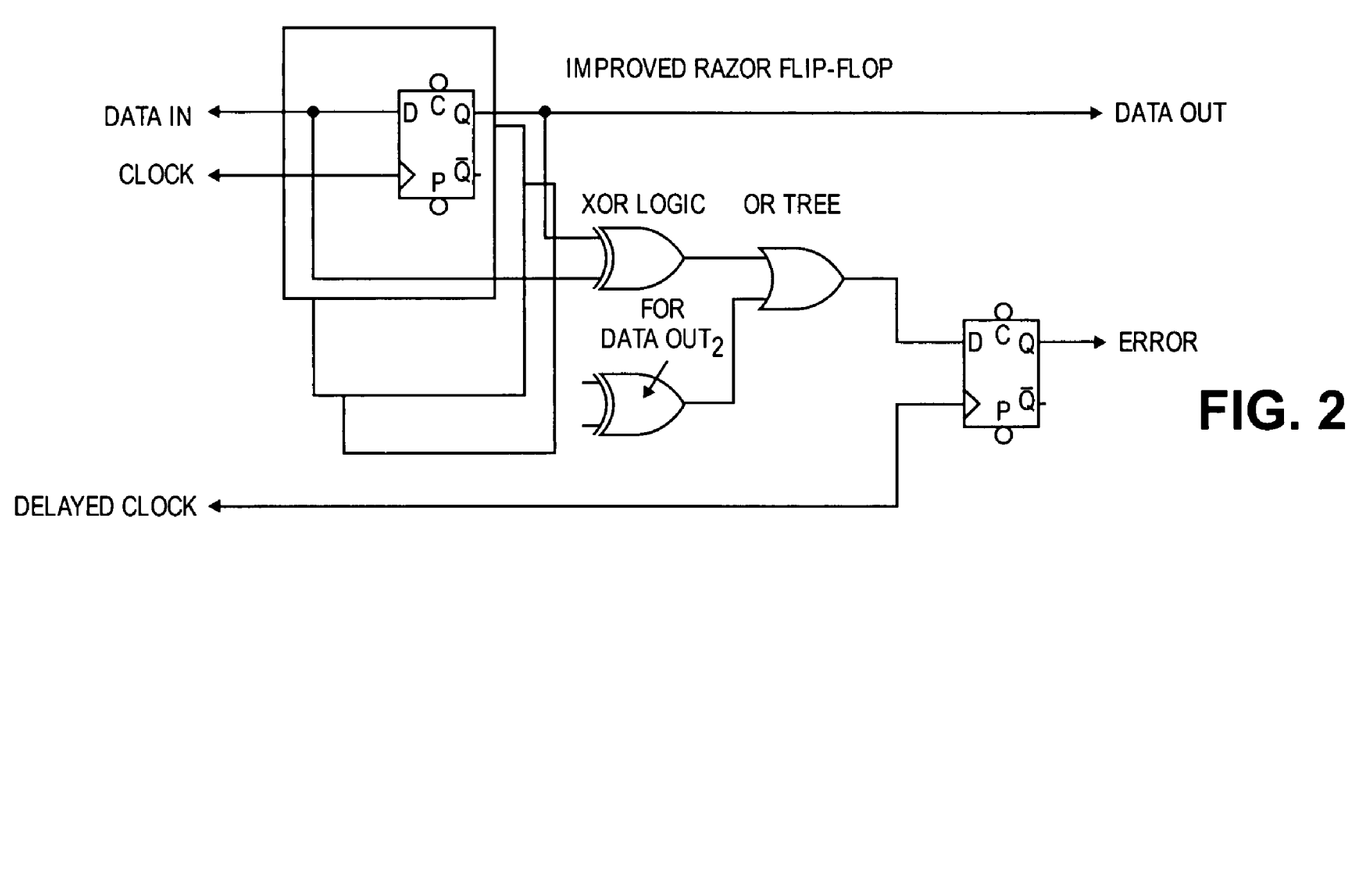
FIG. 2 illustrates a schematic for enabling timing error detection as utilized by some embodiments.

FIG. 2 illustrates a schematic for enabling timing error detection as utilized by some embodiments. This schematic is one embodiment for detecting a timing error. The second XOR gate is for the other Data Out signals. In one embodiment, all signals that can cause a timing failure are monitored. The "OR tree" is used to collect all of them together to form the final "error" signal. That is when any of the Data_out signal has a timing failure the error signal will be asserted.

Figure 3:
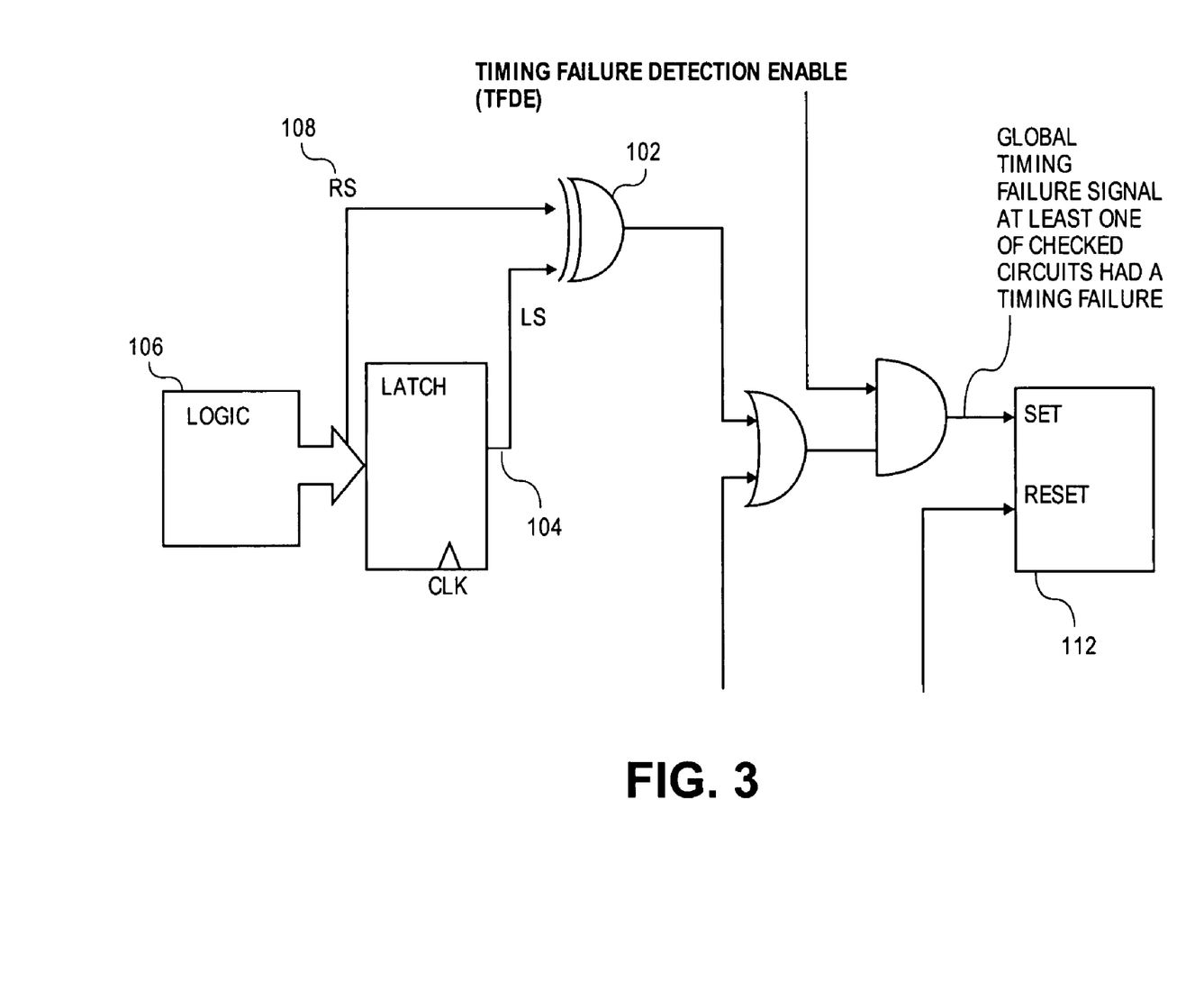
FIG. 3 illustrates a schematic for enabling timing error detection as utilized by some embodiments.

FIG. 3 illustrates a schematic for enabling timing error detection as utilized by some embodiments. In this embodiment, the detector circuit detects timing failures from logic block 106 and produces a single bit that indicates an incorrect result was latched. The detector circuit utilizes a comparator (XOR gate) 102 for comparing the latched result (LS) 104 with the result presented at the input prior to the latch (RS) 108. If the latched result ever differs from the input presented at the input of the latch, the comparator (an XOR) 102 asserts a Timing Failure Signal (TFS). In certain situations, the RS and LS signals often differ even during correct operation. Therefore, the detector circuit should observe the transition in a fixed period of time, specified as the error detect zone of length dmin as described in connection with FIG. 4. This is accomplished functionally through a Timing Failure Detection Enable (TDFE) and an asynchronous storage element 112. In this embodiment, the asynchronous storage element 112 is an SR latch. Other embodiment using dynamic circuits can be realized where the reset signal is part of the precharge process.

Figure 4:
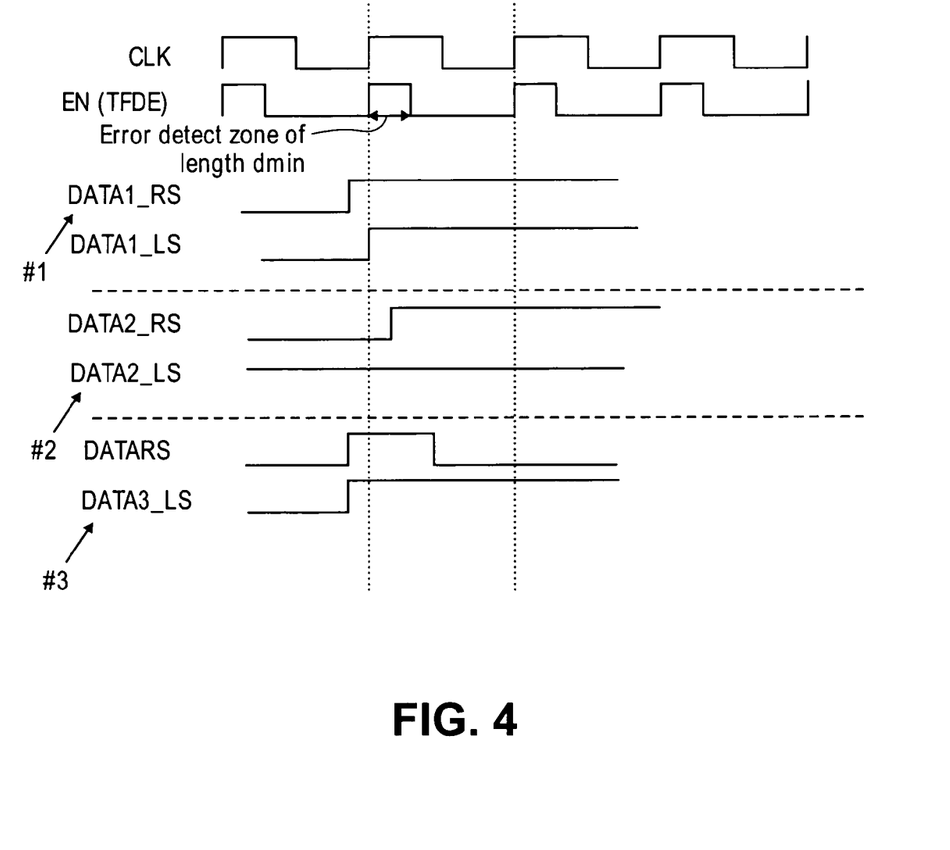
FIG. 4 illustrates a plurality of timing diagrams for examples of detecting timing errors for as utilized by some embodiments.

As previously discussed, the asynchronous storage element 112 defines timing error detection is enabled to allow timing error observation in a fixed period of time, "specified as the error detect zone of length dmin" in connection with FIG. 4. The assertion of a reset signal, an input to asynchronous storage element 112, defines a time period where the detector circuit is not observing for timing failures.

A more detailed discussion of enabling the timing error detection is discussed with several waveform examples depicted in FIG. 4.

FIG. 4 illustrates a plurality of timing diagrams for examples of enabling timing error detection as utilized by some embodiments.

As previously discussed in connection with FIGS. 2 and 3, the claimed subject matter teaches a detector circuit for observing timing failures from logic blocks. If the latched result ever differs from the input presented at the input of the latch, the comparator (an XOR) 102 asserts a Timing Failure Signal (TFS). In certain situations, the RS and LS signals often differ even during correct operation. Therefore, the detector circuit should observe the transition in a fixed period of time, specified as the error detect zone of length dmin. This is accomplished functionally through a Timing Failure Detection Enable (TDFE) and an asynchronous storage element 112. In this embodiment, the asynchronous storage element 112 is an SR latch.

In one embodiment, the dmin error detect zone may be in a range of 20 to 50% of the duty cycle for the clock. However, the claimed subject matter is not limited to this range for the duty cycle. For example, one skilled in the art appreciates utilizing different duty cycle ranges based on timing analysis for their respective design and circuitry. One could utilize various factors for selecting dmin, such as, the complexity of the design, the process technology, analysis of the minimum path for fast signals, etc. . . .

In the previously discussed embodiment, the timing error detection zone may be defined by the clock signal rising edge on one end and a minimum path delay on the other end.

In this figure, an enable signal, EN (TFDE) defines the error detection zone timing window of length dmin, where timing failures can be detected. As previously discussed in connection with FIG. 3 LS and RS must differ within this window if a timing failure is to be detected.

The following three examples illustrate the enabling of the timing error detection.

The first example illustrates that both signals, DATA 1 RS and DATA 1 LS arrive on time with respect to a leading edge of a clock signal, CLK. Therefore, no Timing Failure occurs or detected since DATA 1 LS and DATA 1 RS match during the error detect zone, specified as dmin.

The second example illustrates Data2 RS arrives late with respect to a leading edge of a clock signal, CLK. Thus, a timing Failure occurs and it is detected correctly since DATA2 LS and DATA 2 RS differ during error detect zone.

The third example illustrates Data3 arriving on time, with the second result arriving early. Thus, it is correctly identified as not a Timing Failure since DATA 3 LS and DATA3 RS match during error detect zone.

Figure 5:
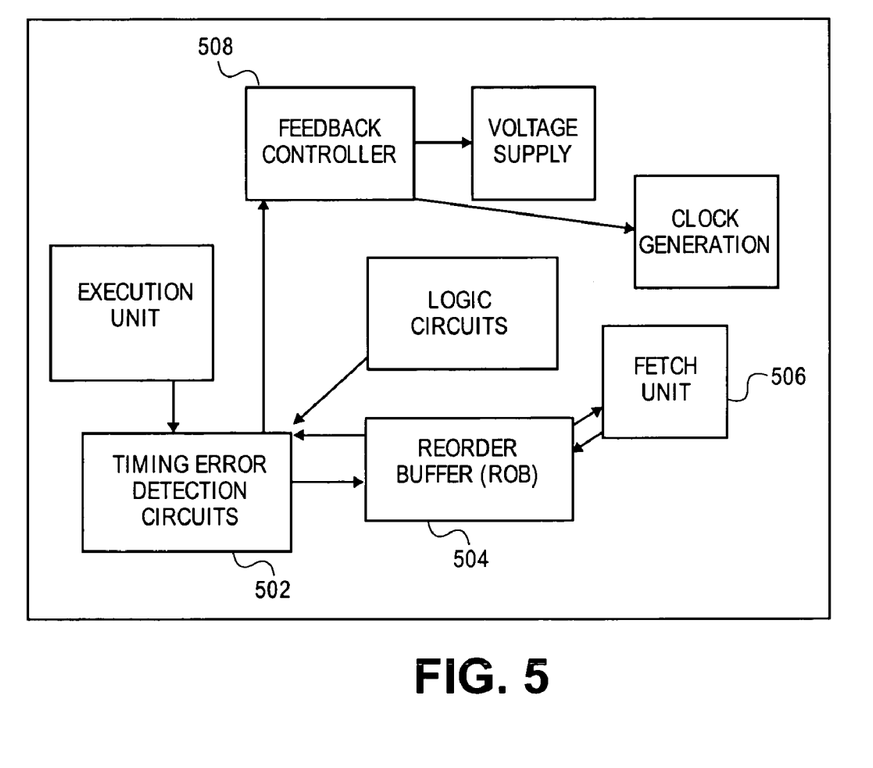
FIG. 5 illustrates a block diagram of an apparatus that facilitates recovery from a timing error as utilized by some embodiments.

FIG. 5 illustrates a block diagram of an apparatus that facilitates recovery from a timing error as utilized by some embodiments. In this embodiment, the apparatus is a processor that utilizes the timing detection enable circuitry and methods discussed and depicted in the other figures of the patent application.

As previously discussed, observation and detection of timing errors from selected logic circuits are detected by the timing error detection enable circuits 502. In one embodiment for detection of a timing Failure, the processor prevents an architectural state from being corrupted by the incorrectly computed result caused by the timing failure. In one embodiment, the timing failure may be from a single circuit and is logically ORed with other circuits to form a global timing failure signal. Consequently, in one embodiment to ensure correct operation of the processor, the processor prevents all computed results from being committed, written to architectural state, until the results can be verified to be free of timing failures. In one embodiment, the processor is an out of order execution (OOO) processor that utilizes a reorder buffer (ROB) 504, wherein the ROB stores the computed results until the timing is verified. In case of a timing failure, the processor may re-compute the result to produce a correct result free of timing errors. For example, the fetch unit 506 of the processor is redirected to re-fetch and re-execute portion of the program starting with the failed instruction. In one embodiment, the processor utilizes a feedback controller 508 that may increase the supply voltage using a voltage regulator or lower the clock frequency, or both, to increase the probability that re-computation completes without a repeated timing error. For example, the re-fetch and re-execution of the portion of the program starting with the failed instruction would be accomplished with either or both an increased supply voltage or lower clock frequency.

In one embodiment, the timing detection enable circuits are incorporated within a processor. In other embodiments, the timing detection enable circuits are incorporated within the MCH or chipset as depicted in FIGS. 6 and 7.

The claimed subject matter is not limited to the depicted processor. One skilled in the art appreciates the many different processor designs that may be employed. The depicted figure merely represents one processor design that allows for detection and recovery from a timing error by preventing an architectural state from being corrupted and re-executing the failed instruction with either or both a reduced frequency or increased operating voltage.

Figure 6:
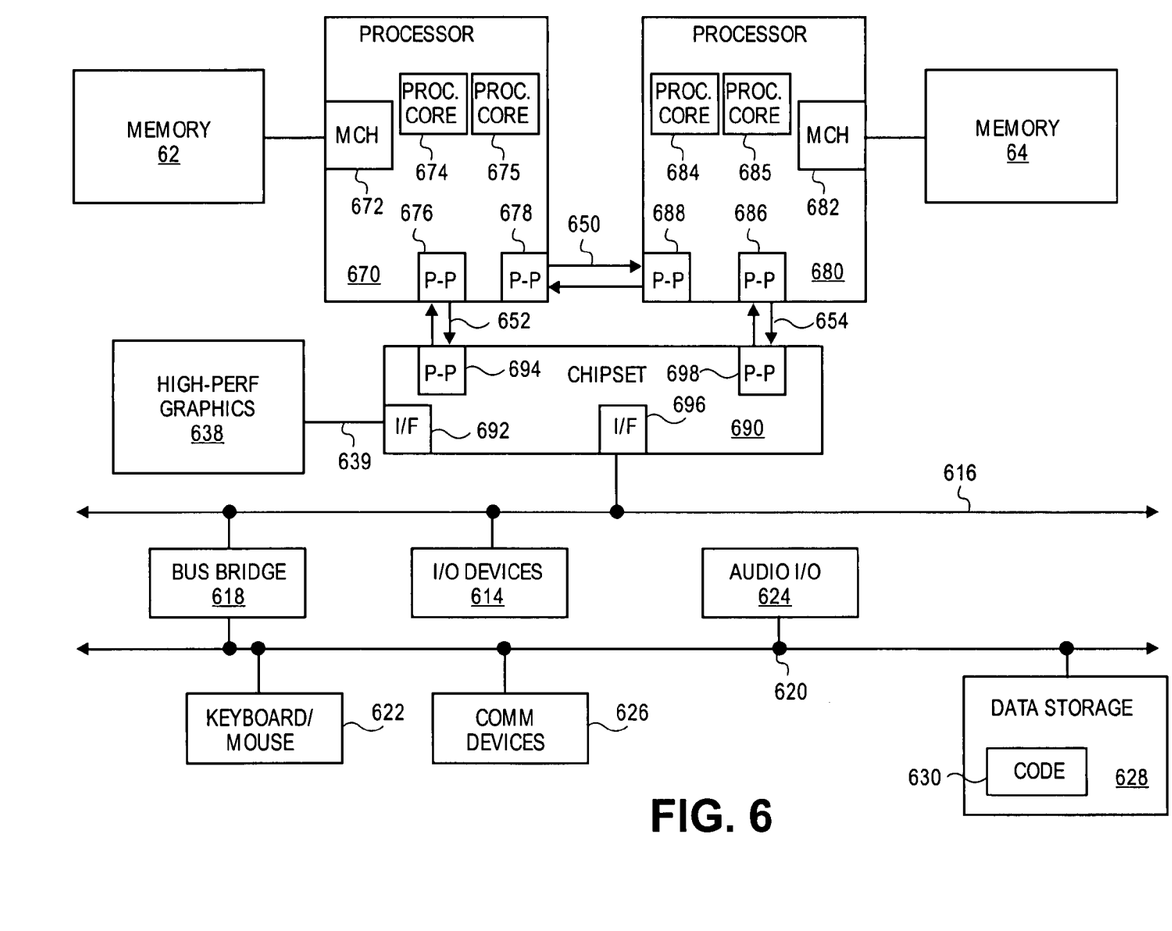
FIGS. 6 and 7 illustrate different systems as utilized by some embodiments.
Figure 7:
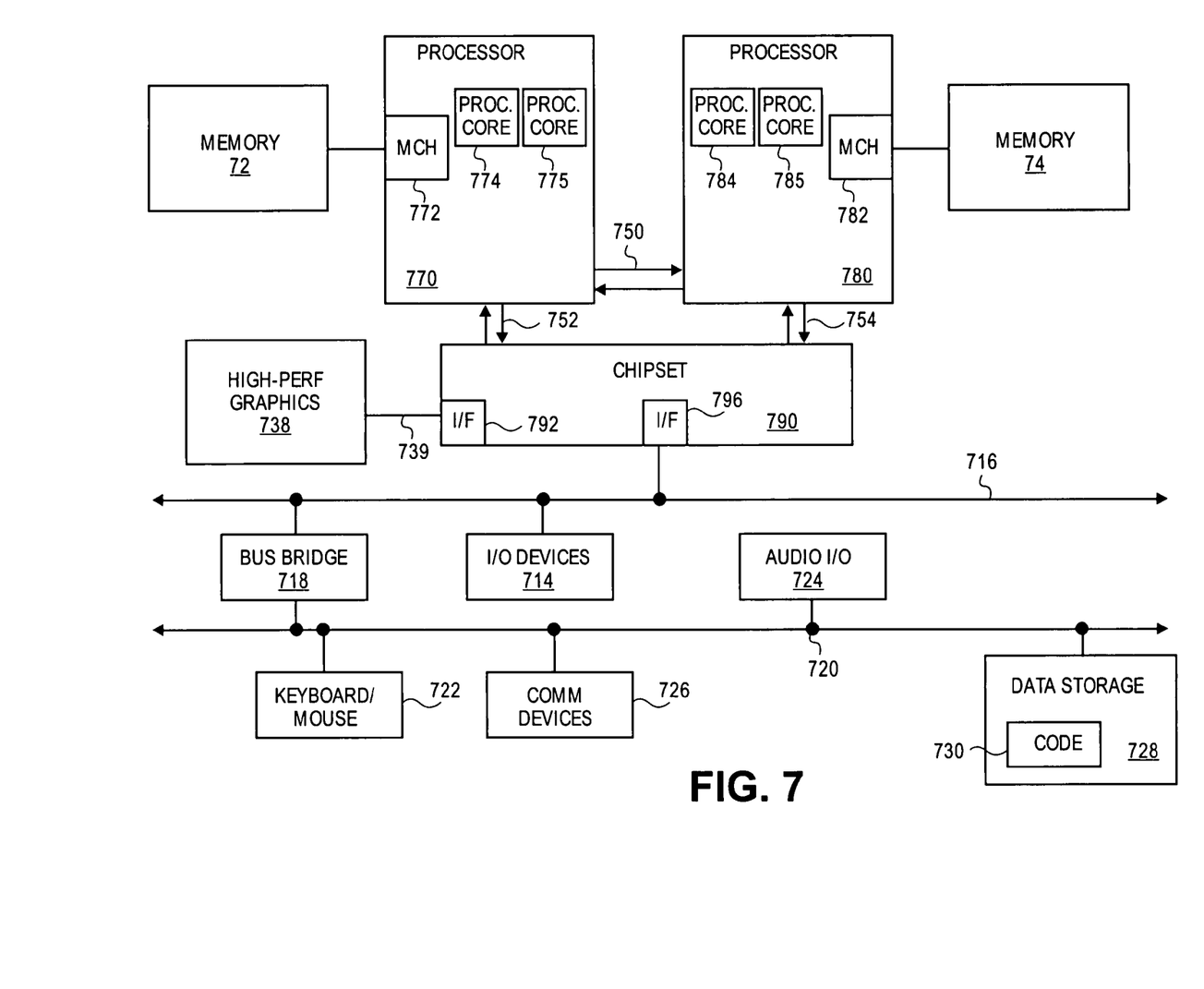

FIG. 6 is a system as utilized by one embodiment of the claimed subject matter. In particular, FIG. 6 shows a system where processors, memory, and input/output devices are interconnected by a number of point-to-point interfaces.

The system of FIG. 6 may also include several processors, of which only two, processors 670, 680 are shown for clarity. Processors 670, 680 may each include a memory controller or a local memory controller hub (MCH) 672, 682 to connect with memory 62, 64. In one embodiment, the memories 62 and 64 are DRAM and/or a cache memory. In one embodiment, the cache memory could be any level of cache memory used by a processor. In one embodiment, processors 670, 680 may exchange data via a point-to-point (PtP) interface 650 using PtP interface circuits 678, 688. Processors 670, 680 may each exchange data with a chipset 690 via individual PtP interfaces 652, 654 using point to point interface circuits 676, 694, 686, 698. In one embodiment, the processors 670 and 680 would have multiple processor cores. 674, 675 and 684, 685 respectively. However, the claimed subject matter is not limited to each processor having two processor cores. The embodiment of two processor cores is merely one example and one skilled in the art appreciates utilizing a different number of processor cores for each processor based at least in part on the die size requirements, processing specifications, power limitations, etc. . . .

Chipset 690 may also exchange data with a high-performance graphics circuit 638 via a high-performance graphics interface 639.

In one embodiment, each processor may support timing detection enablement as depicted in connection with the other figures in the patent application.

At least one embodiment of the invention may be located within the PtP interface circuits within each of the PtP bus agents of FIG. 6. Other embodiments of the invention, however, may exist in other circuits, logic units, or devices within the system of FIG. 6. Furthermore, other embodiments of the invention may be distributed throughout several circuits, logic units, or devices illustrated in FIG. 6.

FIG. 7 is a system as utilized by one embodiment of the claimed subject matter.

In particular, FIG. 7 shows a system where processors, memory, and input/output devices are interconnected by a front side bus (FSB).

The system of FIG. 7 may also include several processors, of which only two, processors 670, 680 are shown for clarity. In one embodiment, the processors 770 and 780 have a single processor core. In another embodiment, the processors 770 and 780 have two processor cores, as depicted in the figure. The Processors 770, 780 may each include a memory controller or a local memory controller hub (MCH) 772, 782 to connect with memory 72, 74. In one embodiment, the memories 72 and 74 are DRAM and/or a cache memory. In one embodiment, the cache memory could be any level of cache memory used by a processor. In one embodiment, processors 770, 780 may exchange data via a point-to-point (PtP) interface 750 using PtP interface circuits 778, 788. Processors 770, 780 may each exchange data with a chipset 790 via a front side bus. Chipset 790 may also exchange data with a high-performance graphics circuit 238 via a high-performance graphics interface 739.

In one embodiment, each processor may support timing detection enablement as depicted in connection with the other figures in the patent application.

Figure 8:
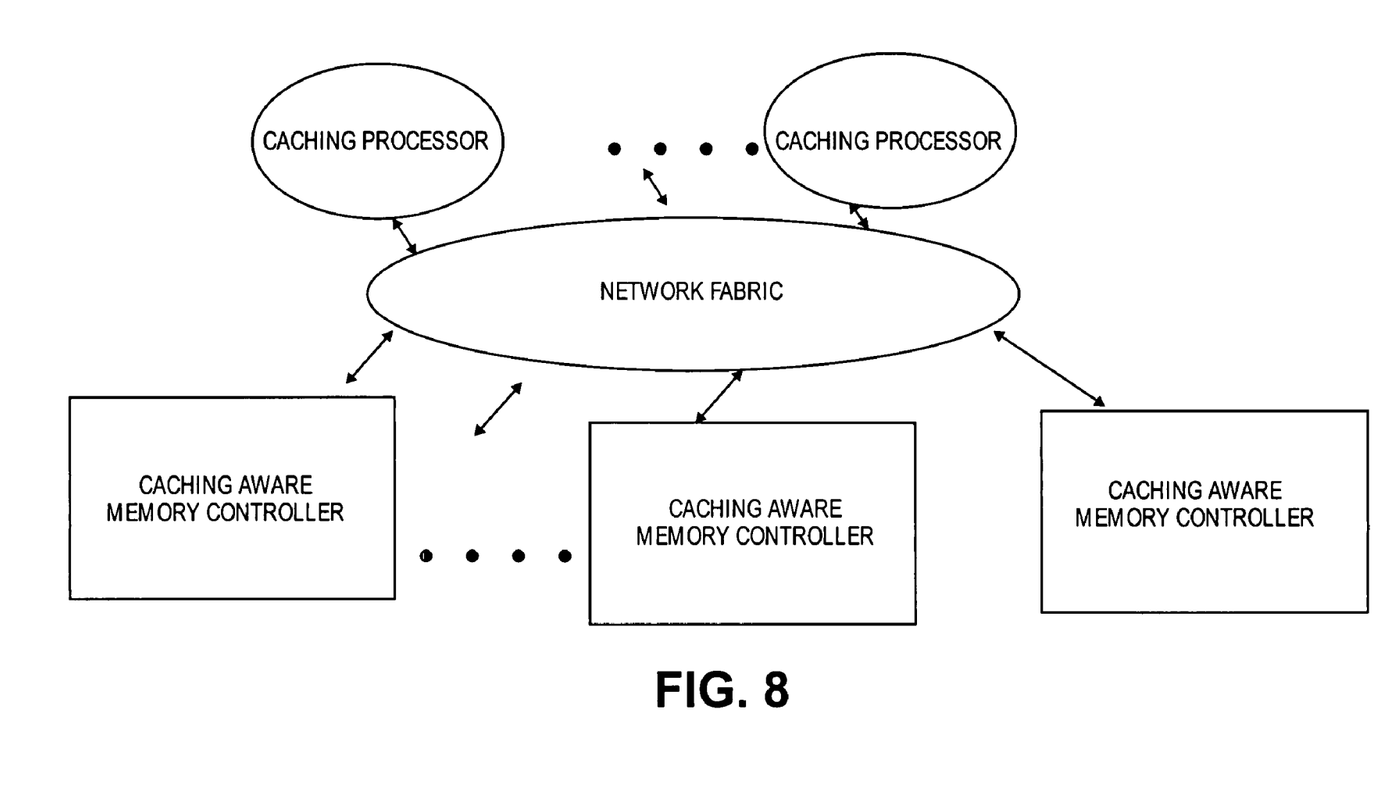
FIG. 8 is protocol architecture as utilized by some embodiments.

FIG. 8 is a high level, simplified abstraction of protocol architecture as utilized by one embodiment. The fabric facilitates transporting messages from one protocol (caching processor agent or caching aware memory controller agent) to another protocol for a point to point network. For example, the network fabric adheres to a layered protocol scheme and may comprise either or all of: a link layer, a physical layer, a protocol layer, a routing layer, a transport layer. The layers are depicted in connection with FIG. 9. The link layer facilitates the initialization of the link, the protocol defines the cache coherence, and the routing and transport layers facilitate different system configurations and are optional. The layered protocol scheme is not limited to the depicted layers since different system configurations may select to use some or all of the depicted layers. The fabric facilitates transporting messages from one protocol (home or caching agent) to another protocol for a point to point network. In one aspect, the figure depicts a cache coherence protocol's abstract view of the underlying network.

Figure 9:
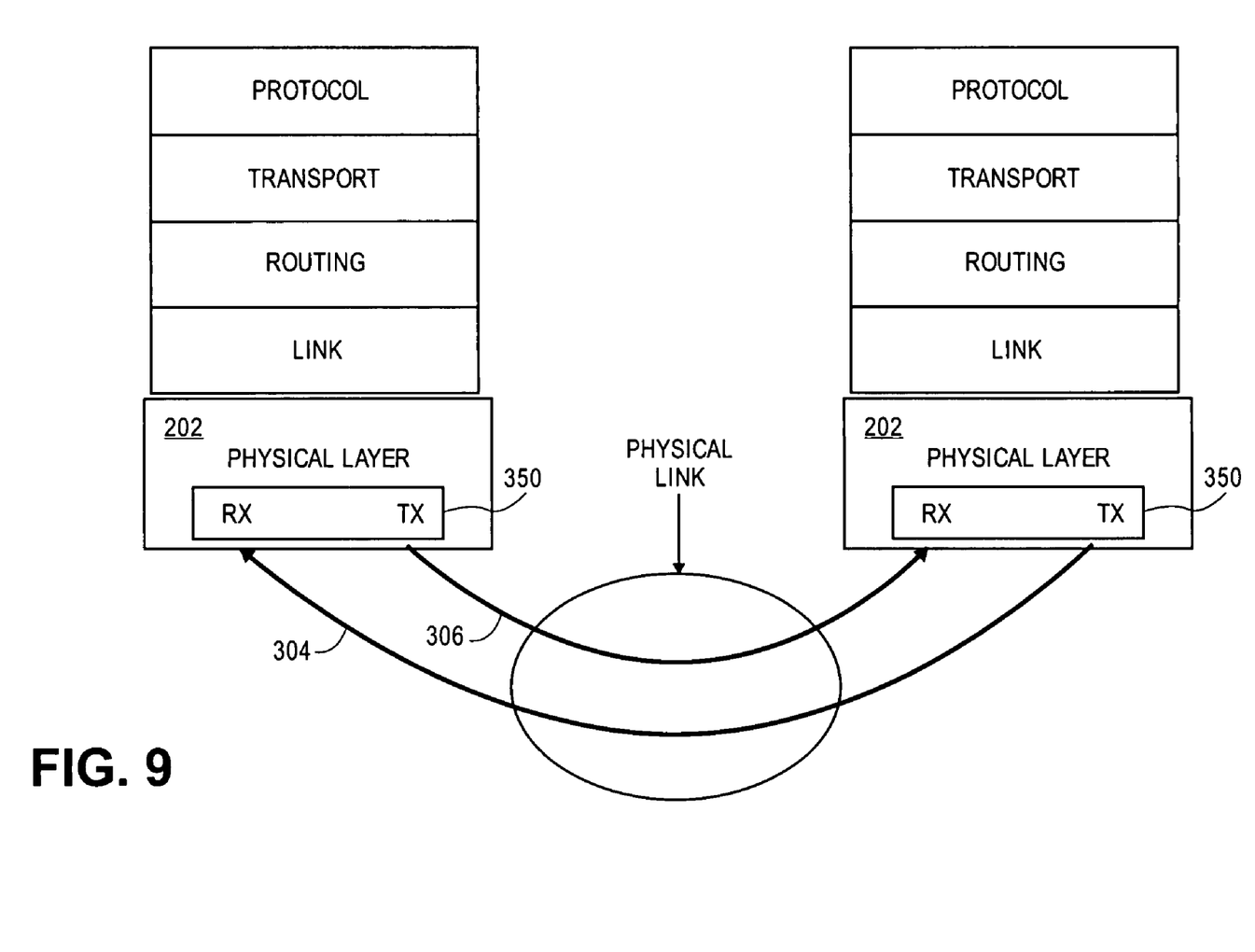
FIG. 9 is a block diagram of an apparatus for a physical interconnect utilized in accordance with the claimed subject matter.

FIG. 9 is a block diagram of an apparatus for a physical interconnect utilized in accordance with the claimed subject matter. In one aspect, the apparatus depicts a physical layer for a cache-coherent, link-based interconnect scheme for a processor, chipset, and/or IO bridge components. For example, the physical interconnect may be performed by each physical layer of an integrated device. Specifically, the physical layer provides communication between two ports over a physical interconnect comprising two uni-directional links. Specifically, one uni-directional link 304 from a first transmit port 350 of a first integrated device to a first receiver port 350 of a second integrated device. Likewise, a second uni-directional link 306 from a first transmit port 350 of the second integrated device to a first receiver port 350 of the first integrated device. However, the claimed subject matter is not limited to two uni-directional links. One skilled in the art appreciates the claimed subject matter supports any known signaling techniques, such as, bi-directional links, etc.

Also, the claimed subject matter depicted in the previous Figures may be implemented in software. For example, the software may be stored in an electronically-accessible medium that includes any mechanism that provides (i.e., stores and/or transmits) content (e.g., computer executable instructions) in a form readable by an electronic device (e.g., a computer, a personal digital assistant, a cellular telephone, or any wireless product). For example, a machine-accessible medium includes read only memory (ROM); random access memory (RAM); magnetic disk storage media; optical storage media; flash memory devices; electrical, optical, acoustical, wireless, or other form of propagated signals (e.g., carrier waves, infrared signals, digital signals).

Although the claimed subject matter has been described with reference to specific embodiments, this description is not meant to be construed in a limiting sense. Various modifications of the disclosed embodiment, as well as alternative embodiments of the claimed subject matter, will become apparent to persons skilled in the art upon reference to the description of the claimed subject matter. It is contemplated, therefore, that such modifications can be made without departing from the spirit or scope of the claimed subject matter as defined in the appended claims.

The invention claimed is:

1. An apparatus for timing error detection comprising:
 a timing error detection circuit to generate a timing error detection zone, and to compare a first signal and a second signal during the timing error detection zone;
 a logic circuit to prevent all computed results from being written to architectural state until the results can be verified to be free of timing failures upon detection of a timing error by storing the results in a reorder buffer (ROB) until the timing is verified;
 a feedback controller to decrease an operating frequency or increase an operating voltage upon detection of the timing error; and
 a fetch logic unit to re-execute a failed instruction that results from detection of the timing error with a decreased operating frequency or increased operating voltage.

2. The apparatus of claim 1 wherein to prevent the incorrect result to be committed by preventing the incorrect result to be written to an architectural state.

3. The apparatus of claim 1 wherein timing error detection zone is defined by the clock signal rising edge on one end and a minimum path delay on a falling edge.

4. The apparatus of claim 1 wherein the second signal is generated by an output of a storage element based on the first signal as an input to the storage element.

5. The apparatus of claim 1 wherein the apparatus is a processor to support an out of order execution mode.

6. A system comprising:
 a dynamic random access memory to receive memory requests;

at least one processor, to generate memory requests to the DRAM;

the processor with:

a timing error detection circuit to generate a timing error detection zone, and to compare a first signal and a second signal during the timing error detection zone; and a logic circuit to prevent all computed results from being written to architectural state until the results can be verified to be free of timing failures upon detection of a timing error by storing the results in a reorder buffer (ROB) until the timing is verified;

a feedback controller to decrease an operating frequency or increase an operating voltage upon detection of the timing error; and a fetch logic unit to re-execute a failed instruction that results from detection of the timing error with a decreased operating frequency or increased operating voltage.

7. The system of claim 6 wherein to prevent the incorrect result to be committed by preventing the incorrect result to be written to an architectural state.

8. The system of claim 6 wherein timing error detection zone is defined by the clock signal rising edge on one end and a minimum path delay on a falling edge.

9. The system of claim 6 wherein the second signal is generated by an output of a storage element based on the first signal as an input to the storage element.

10. The system of claim 6 wherein the apparatus is a processor to support an out of order execution mode.

\* \* \* \* \*